United States Patent [19]

Liau et al.

[11] 4,444,627

[45] Apr. 24, 1984

[54] PREVENTION OF POLYMER BUILDUP IN POLYMERIZATION REACTORS USING THIN ORGANIC COATINGS BY ELECTROLYSIS OF PHENOL

[75] Inventors: Shung-Chung Liau; Wei-Min Cheng; Uen-Long Young, all of Kaohsiung, Taiwan

[73] Assignee: Formosa Plastics Corporation, Taiwan

[21] Appl. No.: 352,101

[22] Filed: Feb. 25, 1982

[51] Int. Cl.$^3$ ............................ B01D 3/00; C07B 5/00
[52] U.S. Cl. .................................. 204/26; 204/14 N; 422/241
[58] Field of Search ................... 204/14 N, 26, 59 R; 422/241

[56] References Cited

U.S. PATENT DOCUMENTS

| | | | |
|---|---|---|---|
| 2,961,384 | 11/1960 | McKinney | 204/14 N |
| 3,335,075 | 8/1967 | Borman | 204/59 R |
| 3,825,434 | 7/1974 | Berens | 422/241 |
| 4,200,712 | 4/1980 | Cohen | 422/241 |
| 4,231,851 | 11/1980 | Mengoli | 204/14 N |
| 4,334,054 | 6/1982 | Dubois | 204/14 N |

Primary Examiner—John F. Niebling
Attorney, Agent, or Firm—Brumbaugh, Graves, Donohue & Raymond

[57] ABSTRACT

A method of effectively preventing the buildup of polymers on the internal surfaces of polymerization reactors by coating the inner surfaces with a thin organic film produced by electrolysis of phenol or phenol derivatives in a solution of a Lewis Base and a non-aqueous solvent.

15 Claims, No Drawings

PREVENTION OF POLYMER BUILDUP IN POLYMERIZATION REACTORS USING THIN ORGANIC COATINGS BY ELECTROLYSIS OF PHENOL

This invention relates to an improved method of coating the inner walls of polymerization reactors to substantially reduce or eliminate polymer scale adhesion on the inner walls of the reactors, on the surfaces of agitators and on other equipment attached thereto. Further, the present invention provides a novel process for coating the inner surfaces of a polymerization reactor with a thin film which is substantially pinhole-free and, therefore, prevents the monomer or monomers from contacting the inner walls of the reactor and substantially reduces corrosion of the walls of the reactor.

BACKGROUND OF THE INVENTION

Polymer scale which builds up on the walls of reactors during polymerization causes a problem for polymer manufacturers. Polymer scale deposited on the various surfaces within the polymerization reactor causes a decrease in polymer yield and a reduction in the cooling capacity of the polymerization reactor. Further, the polymer scale deposited on the surfaces tends to come off and enters into the polymer product, resulting in production of a polymer product of lower quality. Furthermore, the removal of scale from the inner surfaces after each polymerization run requires large amounts of labor and time, resulting in the reduction of productivity. Additionally, inhalation of volatile monomers, especially vinyl chloride during the scale-removing operation causes serious health problems.

To solve such problems, a number of methods have been proposed to prevent polymer scale deposition, specifically in the suspension polymerization of vinyl chloride or a monomer mixture composed mainly of vinyl chloride. In some methods ingredients are added during the polymerization reaction itself. In other methods the walls of the reactor are sprayed with an inert film containing scale preventing agents, such as dyes or condensation polymer, most of which are prepared by other procedures. These prior art methods have, in fact, been successful in some cases for the commercial production of polyvinylchloride (PVC) resin. But certain disadvantages still exist.

Spraying an inert film on the inner walls of a polymerization reactor to prevent polymer scale buildup has a fatal defect in that it is impossible to spray coat homogeneously. Additionally, spraying to every point of the reactor still leaves many pinholes on surfaces of the reactor after the solvent evaporates and allows unreacted monomers to come in contact with the inner surfaces of the reactors and cause corrosion. Therefore, there is a need to overcome these defects in the spray coating methods of preventing scale.

The present invention is an electrochemical method. The well-known compound, phenol and its alkyl derivatives are weak acids with pK values of about 10 (in water). The electrochemical oxidation of these phenol compounds produces products of high molecular weight, especially where the procedure is carried out in a non-aqueous system. In the present invention wherein the polymerization reactor acts as the anode and an iron bar as the cathode, phenol and its halo and alkyl derivatives are electrolyzed using a non-aqueous solvent and a Lewis Base. A thin organic coating is produced which adheres to the reactor's inner walls. This coating prevents the deposit of scale on the wall. The coating being substantially pinhole-free also prevents pass through of monomers to the inner surfaces of the reactor during polymerization.

SUMMARY OF THE INVENTION

It has now been found that the inner surfaces of a polymerization reaction vessel, particularly one having inner surfaces of stainless steel, may be coated with a film whereby undesirable buildup of polymers of ethylenically unsaturated monomer and monomers other than vinyl chloride on the reactors walls can be substantially decreased and in many cases entirely eliminated.

In the present invention the polymerization reactor is used as the anode, and an iron bar is inserted through the manhole into the reactor and used as the cathode. A solution which contains phenol or its halo- or alkyl derivatives and a Lewis Base in a non-aqueous solvent is introduced into the polymerization reactor and electrolyzed. An electrochemically oxidized phenol film is produced and adheres to the inner surface of the reactor and those parts that might otherwise come into contact with the monomer. As a result of this invention there is almost no problem with polymer scale buildup.

DETAILED DESCRIPTION

To alleviate the problems of spray coating and other methods, we have invented the method of the present invention wherein the inner surfaces of the reactors are coated with a thin, virtually pinhole-free organic film produced by electrolysis of phenol and its halo and alkyl derivatives.

The electrochemical oxidation of phenol or its derivatives is carried out in the reactor, and leads to the production of high molecular weight polymers which form a pinhole-free thin coating on the inner surfaces of the reactor. This thin organic film is insoluble in organic solvents and water, and is soluble only in strongly alkaline solutions. Therefore, the inner surfaces of the reactor do not come into contact with the polymerization medium, and scale buildup is prevented. The electrolysis procedure of the invention is carried out in a non-aqueous system. The electrolytic bath is a solution of the water-free phenol compound in a polar solvent such as ethylene dichloride. About 0.1 to about 0.5 mole of Lewis Base, such as aniline, per mole of phenol or phenol derivative is added to promote the ionization of phenol or phenol derivative and makes the solution conductive. Preferably the concentration is about 0.25 mole of Lewis Base per mole of phenol or phenol derivative. The main components of the system are phenol molecules, negatively charged phenoxy ions, and positively charged phenylaminium ions.

When an electric current is passed through the electrolytic bath, the ions of phenylaminium migrate to the cathode and hydrogen is evolved. Phenoxy ions are discharged at the anode. The phenoxy ions react to give large molecules with a polyphenylene-ether structure in accordance with the scheme:

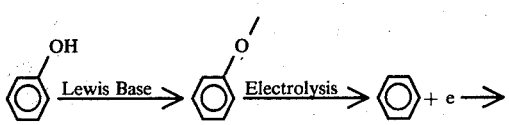

-continued

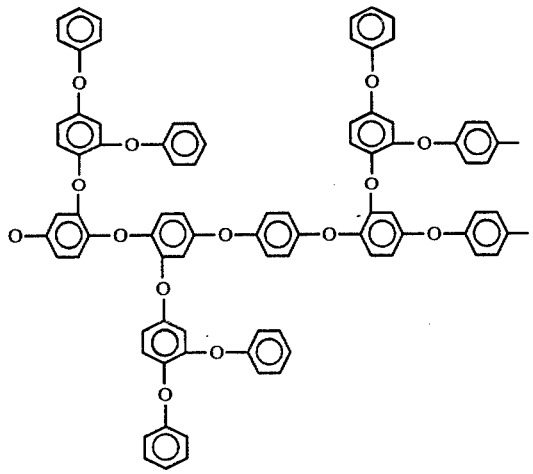

The phenol compounds, as mentioned above, may be the phenol or phenol derivatives which have the structure

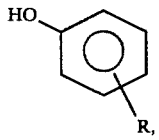

where R is hydrogen, halide or alkyl. The quantity of phenol compound which is necessary depends on the area of the inner surfaces of the reactor, the thickness of film desired and the like. The non-aqueous solvent used in the electrolytic bath may be ethylene dichloride (EDC), acetonitrile, dichlorobenzene, methanol, or the like. The Lewis Base may be aniline, triethylamine, pyridine or other suitable electron donors. The preferred quantity of Lewis Base is about 0.25 mole per mole of phenol or phenol derivative.

In a preferred embodiment the polymerization reactor is filled with electrolytic solution which contains aniline, phenol and ethylene dichloride until the level of solution approches the manhole and then an iron bar is inserted through the manhole into the electrolytic solution. Thereafter, both the reactor and the iron bar are connected to an electric source. The reactor acts as the anode and the iron bar as the cathode. Either the voltage or current density may be preset after which the electric source is activated. After a fixed time, a thin pinhole-free coating is obtained covering the anode, i.e., the inner surfaces of the reactor. The coating film produced by this method is extremely homogeneous and covers every surface of the reactor that may come into contact with the polymerization medium. The film produced by this invention absolutely prevents the contact of the polymerization medium with the surfaces of the reactor. Additionally, polymers produced in the reactor do not adhere to the coating produced in this invention, therefore, the problems of scale buildup are substantially reduced.

According to Faraday's Law the total amount of the material deposited on the electrodes is directly proportioned to the total amount of electric charge which passes through the solution. Therefore, in a preferred embodiment of the invention the voltage and the current density are chosen such that the thickness of film obtained is about 0.05 μm to about 0.6 μm. An electric current density of about 1 mA/cm$^2$ to about 2 mA/cm$^2$ is acceptable. An electric current density of about 1 mA/cm$^2$ is preferred. A maximum voltage of about 100 V to about 500 V is acceptable. A voltage of about 200 V is preferred.

After the polymerization reactor is treated in the method described herein, polymerization is carried out by normal commercial methods, such as charging demineralized water and removing oxygen therefrom, adding a suspension agent, an initiator and the selected monomers. Polymerization is initiated by heating at a temperature as required for a period of from about 2 to 12 hours with agitation being applied throughout the course of the reaction. When the reaction is completed, the pressure will drop and unreacted monomer is removed. Then, the polymer is removed and the inner walls of the reactor are rinsed by water.

The ratio of monomer to water employed in the aqueous polymerization is not a particularly critical factor and is about 1:1 to 1:5 and preferably about 1:1.5 to 1:3. The total amount of monomer can be added to the polymerization system before the polymerization is begun. Alternatively, the monomer can be added in stages or continuously during the polymerization depending on the polymer desired.

The polymerization initiator employed is not a critical factor and may be an organic peroxide or hydroperoxide such as benzoyl peroxide; redox agents such as persulfates plus reducing agents, or hydroperoxides plus ferrous ion, e.g., sodium formaldehyde sulfoxylate or hydrogen peroxide plus a ferrous salt. Azo compounds such as azobisisobutyronitrile and organometallic reagents such as silver alkyls may also be used as the polymerization initiator. The amount of initiator used is about 0.001 to 1 part by weight per 100 parts by weight of the monomer.

Also included is a suspension agent such as methyl cellulose, gelatin and the like. About 0.05 to 5% of the suspension agent, based on the total weight of monomer, is used.

The polymerization temperature varies depending on the kind and composition of the monomer. Generally, the temperature is in the range of about 0° C. to 150° C. The preferred temperature is in the range of about 20° C. to 100° C.

The apparatus of the present invention is especially suitable for use in heterogeneous free radical polymerization wherein the polymer formed separates out of the polymerization mixture as the polymerization reaction proceeds. Monomers particularly suitable include: vinyl chloride; vinylidene halides; vinyl esters, such as vinyl acetate and vinyl propionoate; acrylic acid; and methacrylic acid and esters.

The following examples illustrate the method of the present invention in further detail. These examples are given solely by way of illustration of the instant invention and are not to be construed to limit it. These examples are divided into seven parts, in every part only one quanitity, such as electromotive force, amount of electric current, concentration of Lewis Base, or the phenol compound used is varied and the other quantities are kept constant. All parts and percentage are by weight unless otherwise specified.

EXAMPLE I

A clean reactor was filled with a solution of about 97.5% ethylene dichloride, about 2% phenol and about 0.5% aniline. An iron bar was inserted through a manhole into the reactor. Both the reactor, which acted as the anode, and the iron bar, which acted as the cathode, were connected to an electric source. The electric current density was set at 1 mA/cm$^2$, and the voltage was increased as the time passed. Electrolysis was carried out at 30° C. After 5 hours the voltage reached 200 V, the electric source was removed. The aniline and the ethylene dichloride solution was removed and the reactor was rinsed with water. A film of about 0.05 $\mu$m to 0.6 $\mu$m was formed on all of the inner surfaces of the reactor. Thereafter, the following were added to the reactor for polymerization.

| | |
|---|---|
| Vinylchloride Monomer | 50 kg |
| Demineralized Water | 80 kg |
| KH-17* | 40 g |
| ABVN** | 15 g |

*78% hydrolyzed PVA
**azobisdimethylvaleronitrile

The temperature was maintained at about 57° C. until the reactor's pressure dropped 1 kg/cm$^2$. The reactor was then emptied and rinsed with water. The amount of scale which built up was recorded and then the polymerization process was repeated. The results obtained are set forth in Table I. The amount of buildup was rated from 0 to 10 with 0 being no buildup and 10 being the amount of buildup from a control run wherein the inner surfaces of the reactor were not coated.

TABLE I

| No. of run | non-coated | coated |
|---|---|---|
| 1 | 10 | 0 |
| 2 | — | 0 |
| 3 | — | 0 |
| 4 | — | 1 |
| 5 | — | 1 |
| 6 | — | 2 |
| 7 | — | 3 |
| 8 | — | 4 |
| 9 | — | 5 |
| 10 | — | 7 |
| 11 | — | 9 |
| 12 | — | 10 |

EXAMPLE II

A clean reactor was filled with the non-aqueous solution described in Example I using the procedure described in Example I up to the point where the electric source was attached. At this point, the electric current density was fixed at 1 mA/cm$^2$ and the maximum voltage was varied using: (A) 20 V, (B) 100 V, (C) 200 V, and (D) 500 V. Electrolysis was carried out for about 5 hours at about 30° C. Thereafter the aniline and ethylene dichloride solution was removed and the reactor was rinsed with water. A film was formed on all of the inner surfaces of the reactor. The reactor was filled with the polymerization reactants of Example I and polymerization was carried out as described in Example I. Observations were made of the amount of buildup at the end of each run. The results are set forth in Table II.

TABLE II

| No. of run | A | B | C | D |
|---|---|---|---|---|
| 1 | 1 | 0 | 0 | 0 |
| 2 | 2 | 1 | 0 | 0 |
| 3 | 2 | 1 | 0 | 1 |
| 4 | 3 | 2 | 1 | 1 |
| 5 | 5 | 3 | 1 | 2 |
| 6 | 7 | 4 | 2 | 3 |
| 7 | 9 | 5 | 3 | 4 |
| 8 | 10 | 6 | 4 | 5 |
| 9 | — | 8 | 5 | 7 |
| 10 | — | 10 | 7 | 9 |
| 11 | — | — | 9 | 10 |
| 12 | — | — | 10 | — |

The best results were obtained when the maximum voltage was 200 V.

EXAMPLE III

A clean reactor was filled with the non-aqueous solution described in Example I using the procedure described in Example I up to the point where the electric source was attached. At this point, the maximum voltage was fixed at 200 V and the electric current density was varied using: (A) 0.2 mA/cm$^2$, (B) 1 mA/cm$^2$, (C) 2 mA/cm$^2$ and (D) 10 mA/cm$^2$. It is known that the electric current density may affect the crosslinkage of the electrosynthesis products as well as affect the thickness of the film produced. Electrolysis was carried out for about 5 hours at about 30° C. The reactor was emptied and rinsed with water and filled with the polymerization reactants of Example I and polymerization was carried out as described in Example I. Observations were made of the amount of buildup at the end of each run. The results are set forth in Table III.

TABLE III

| No. of run | A | B | C | D |
|---|---|---|---|---|
| 1 | 1 | 0 | 0 | 0 |
| 2 | 2 | 0 | 0 | 1 |
| 3 | 3 | 0 | 1 | 2 |
| 4 | 5 | 1 | 1 | 3 |
| 5 | 7 | 1 | 2 | 4 |
| 6 | 9 | 2 | 3 | 6 |
| 7 | 10 | 3 | 5 | 8 |
| 8 | — | 4 | 6 | 9 |
| 9 | — | 5 | 8 | 10 |
| 10 | — | 7 | 9 | — |
| 11 | — | 9 | 10 | — |
| 12 | — | 10 | — | — |

The results indicate that the preferred range of electric current density is from about 1 mA/cm$^2$ to 2 mA/cm$^2$.

EXAMPLE IV

A clean reactor was filled with the non-aqueous solution described in Example I using the procedure described in Example I up to the point where the electric source was attached. The theoretically preferred thickness of film of about 0.05 $\mu$m to about 0.6 $\mu$m was kept constant. According to Faraday's Law, one Faraday will electrolyze one chemical equivalent of product. Accordingly, the current density was varied such that: (A) 0.5 mA/cm$^2\times$10 hrs., (B) 1 mA/cm$^2\times$5 hrs., (C) 2 mA/cm$^2\times$2.5 hrs. and (D) 5 mA/cm$^2\times$1 hr. The temperature was maintained at about 30° C. and the voltage was increased until a maximum of 200 V was achieved. The reactor was emptied, rinsed with water and filled with the polymerization reactants of Example I and polymerization was carried out as described in Example I. Observations were made of the amount of buildup at the end of each run. The results are set forth in Table IV.

TABLE IV

| No. of run | A | B | C | D |
|---|---|---|---|---|
| 1 | 0 | 0 | 0 | 0 |
| 2 | 0 | 0 | 0 | 1 |
| 3 | 0 | 0 | 1 | 1 |
| 4 | 1 | 1 | 1 | 2 |
| 5 | 1 | 1 | 2 | 3 |
| 6 | 2 | 2 | 3 | 4 |
| 7 | 3 | 3 | 4 | 5 |
| 8 | 4 | 4 | 5 | 6 |
| 9 | 5 | 5 | 6 | 8 |
| 10 | 7 | 7 | 8 | 10 |
| 11 | 8 | 9 | 10 | — |
| 12 | 9 | 10 | — | — |

The tests showed that when the coating time was increased the film was more homogeneous.

EXAMPLE V

A clean reactor was filled with the non-aqueous solution described in Example I using the procedure described in Example I up to the point where the electric source was attached. At this point, (A) electrolysis was carried out at about room temperature and (B) electrolysis was carried out at 80° C. Electrolysis was carried out for 5 hours at a current density of about 1 mA/cm$^2$ and a maximum voltage of 200 V. A film was formed on all of the inner surfaces of the reactor. Thereafter the reactor was emptied, rinsed with water and filled with the polymerization reactants described in Example I. Polymerization was carried out as described in Example I. Observations were made of the amount of buildup at the end of each run. The results are set forth in Table V.

TABLE V

| No. of run | A | B |
|---|---|---|
| 1 | 0 | 0 |
| 2 | 0 | 0 |
| 3 | 0 | 0 |
| 4 | 1 | 1 |
| 5 | 1 | 1 |
| 6 | 2 | 2 |
| 7 | 3 | 3 |
| 8 | 5 | 4 |
| 9 | 6 | 5 |
| 10 | 8 | 7 |
| 11 | 9 | 9 |
| 12 | 10 | 10 |

From the results, the tests indicate that temperature has no apparent effect on the coating procedure of the present invention.

EXAMPLE VI

A clean reactor was filled with the non-aqueous solution described in Example I using the procedure described in Example I up to the point where the electric source was attached. Thereafter (A), as in Example I, the reactor was not vacuumed before electrolysis to remove oxygen and (B) the reactor was vacuumed before electrolysis to remove oxygen. Electrolysis was carried out at 30° C. for about 5 hours at a current density of about 1 mA/cm$^2$ and a maximum voltage of 200 V. A film was formed on all of the inner surfaces of the reactor. Thereafter the reactor was emptied, rinsed with water and filled with the polymerization reactants described in Example I. Polymerization was carried out as described in Example I. Observations were made of the amount of buildup at the end of each run. The results are set forth in Table VI.

TABLE VI

| No. of run | A | B |
|---|---|---|
| 1 | 0 | 0 |
| 2 | 0 | 0 |
| 3 | 0 | 0 |
| 4 | 1 | 0 |
| 5 | 1 | 0 |
| 6 | 2 | 0 |
| 7 | 3 | 1 |
| 8 | 4 | 2 |
| 9 | 5 | 3 |
| 10 | 8 | 4 |
| 11 | 9 | 5 |
| 12 | 10 | 7 |
| 13 | — | 9 |
| 14 | — | 10 |

Better results are obtained if oxygen is excluded before electrolysis is carried out.

EXAMPLE VII

A clean reactor was filled with the non-aqueous solution described in Example I using the procedure described in Example I up to the point where the electric source was attached. The amount of Lewis Base was varied: (A) 0.025 mole, (B) 0.1 mole, (C) 0.25 mole and (D) 0.5 mole per mole of phenol. Electrolysis was carried out at 30° C. for about 5 hours at a current density of about 1 mA/cm$^2$ and a maximum voltage of 200 V. A film was formed on all of the inner surfaces of the reactor. Thereafter the reactor was emptied, rinsed with water and filled with the polymerization reactants described in Example I. Polymerization was carried out as described in Example I. Observations were made of the amount of buildup at the end of each run. The results are set forth in Table VII.

TABLE VII

| No. of run | A | B | C | D |
|---|---|---|---|---|
| 1 | 1 | 0 | 0 | 0 |
| 2 | 2 | 0 | 0 | 0 |
| 3 | 3 | 1 | 0 | 1 |
| 4 | 5 | 2 | 1 | 1 |
| 5 | 7 | 3 | 1 | 2 |
| 6 | 8 | 4 | 2 | 3 |
| 7 | 10 | 5 | 3 | 4 |
| 8 | — | 7 | 4 | 5 |
| 9 | — | 9 | 5 | 6 |
| 10 | — | 10 | 8 | 8 |
| 11 | — | — | 9 | 10 |
| 12 | — | — | 10 | — |

EXAMPLE VIII

A clean reactor was filled with a solution of about 97.5% ethylene dichloride, about 2% chlorophenol and about 0.5% (a) aniline (b) pyridine. An iron bar was inserted through the manhole into the reactor. Both the reactor, which acted as the anode, and the iron bar, which acted as the cathode, were connected to an electric source. The electric current density was set at 1 mA/cm$^2$, and the voltage was increased as the time passed. Electrolysis was carried out at 30° C. After about 5 hours, the voltage reached 200 V, the electric source was removed. Then, the reactor was emptied, rinsed with water and filled with the polymerization reactants described in Example I. Polymerization was carried out as described in Example I.

At the end of each batch, the amount of scale which built up was recorded and then the polymerization process was repeated. The results obtained are set forth in Table VIII.

TABLE VIII

| No. of run | A | B |
|---|---|---|
| 1 | 0 | 0 |
| 2 | 0 | 0 |
| 3 | 1 | 1 |
| 4 | 1 | 2 |
| 5 | 2 | 2 |
| 6 | 3 | 3 |
| 7 | 4 | 4 |
| 8 | 6 | 6 |
| 9 | 6 | 7 |
| 10 | 8 | 8 |
| 11 | 9 | 9 |
| 12 | 10 | 10 |

EXAMPLE IX

A clean reactor was filled with a solution of about 97.5% Methanol, about 2% cresol and about 0.5% (a) aniline (b) triethylamine (c) pyridine. An iron bar was inserted through the manhole into the reactor. Both the reactor, which acted as the anode, and the iron bar, which acted as the cathode, were connected to an electric source. The electric current density was set at 1 mA/cm$^2$, and the voltage was increased as the time passed. Electrolysis was carried out at 30° C. After about 5 hours, the voltage reached 200 V, the electric source was removed. Then, the reactor was emptied, rinsed with water and filled with the polymerization reactants described in Example I. Polymerization was carried out as described in Example I.

At the end of each batch, the amount of scale which built up was recorded and then the polymerization process was repeated. The results obtained are set forth in Table IX.

TABLE IX

| No. of run | A | B | C |
|---|---|---|---|
| 1 | 0 | 0 | 0 |
| 2 | 0 | 1 | 0 |
| 3 | 1 | 1 | 1 |
| 4 | 2 | 2 | 2 |
| 5 | 3 | 3 | 3 |
| 6 | 3 | 3 | 4 |
| 7 | 4 | 4 | 4 |
| 8 | 6 | 5 | 6 |
| 9 | 7 | 7 | 7 |
| 10 | 8 | 9 | 9 |
| 11 | 10 | 10 | 10 |
| 12 | — | — | — |

Almost no difference among different Lewis bases.

We claim:

1. A method for substantially preventing the buildup of polymers on the internal surfaces of a polymerization reactor which comprises the steps of:

(a) connecting the polymerization reactor to an electric source whereby it will function as an anode;
 (b) inserting a cathode which is connected to an electric source into the reactor;
 (c) introducing into the reactor a solution comprising a phenolic compound having the structural formula:

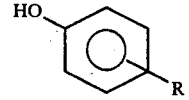

wherein R is selected from the group consisting of hydrogen, halide and alkyl; a Lewis base; and a non-aqueous solvent;
 (d) activating the electric source connected to the cathode and anode;
 (e) electrolyzing the solution in the reactor; and
 (f) electrochemically forming an oxidized phenolic polymer on the inner surface of the anode.

2. The method as defined by claim 1 wherein R is hydrogen.

3. The method as defined by claim 1, wherein R is an alkyl having 1–12 carbon atoms.

4. The method as defined by claim 1, wherein R is Cl.

5. The method as defined by claim 1 wherein the Lewis base is selected from the group consisting of aniline, triethylamine and pyridine.

6. The method as defined by claim 1 wherein the non-aqueous solvent is selected from the group consisting of ethylene dichloride, acetonitrile, dichlorobenzene, and methanol.

7. The method as defined by claim 1 wherein concentration of the phenolic compound is from about 1% to about 10% by weight of the non-aqueous solvent.

8. The method as defined by claim 1 wherein the concentration of the Lewis Base is from about 0.1 to about 0.5 mole per mole of the phenolic compound.

9. The method as defined by claim 8 wherein the concentration of the Lewis Base is about 0.25 mole per mole of the phenolic compound.

10. The method as defined by claim 1 wherein a maximum voltage is from about 100 V to about 500 V.

11. The method as defined by claim 10 wherein the maximum voltage is about 200 V.

12. The method as defined by claim 1 wherein current density is from about 1 mA/cm$^2$ to about 2 mA/cm$^2$.

13. The method as defined by claim 1 wherein thickness of the coating is from about 0.05 $\mu$m to about 0.6 $\mu$m.

14. The method as defined by claim 1 comprising the further step of removing oxygen from the reactor prior to electrolysis.

15. The method as defined by claim 1 comprising the further step of rinsing the surfaces of the reactor with water subsequent to electrolysis.

* * * * *

UNITED STATES PATENT AND TRADEMARK OFFICE
CERTIFICATE OF CORRECTION

PATENT NO. : 4,444,627
DATED : April 24, 1984
INVENTOR(S) : Shung-Chung Liau, et al.

It is certified that error appears in the above-identified patent and that said Letters Patent is hereby corrected as shown below:

Column 2, line 65, "  + e " should read

--  + e⁻ --.

Signed and Sealed this

Eighteenth Day of September 1984

[SEAL]

Attest:

GERALD J. MOSSINGHOFF

Attesting Officer    Commissioner of Patents and Trademarks